United States Patent [19]
Kudo et al.

[11] Patent Number: 6,040,987
[45] Date of Patent: Mar. 21, 2000

[54] DC-DC CONVERTER UNIT

[75] Inventors: Kenji Kudo; Kohji Kuwabara; Shigeharu Yamashita; Kazutoshi Fuchigami, all of Kawasaki; Norikazu Katsuyama, Fukuoka, all of Japan

[73] Assignee: Fujitsu Limited, Kanagawa, Japan

[21] Appl. No.: 09/053,300

[22] Filed: Apr. 1, 1998

[30] Foreign Application Priority Data

Jul. 16, 1997 [JP] Japan ................................ 9-190873

[51] Int. Cl.[7] .................................................. H02M 3/335

[52] U.S. Cl. ........................................ 363/21; 363/131

[58] Field of Search .................... 363/21, 20, 17, 363/131, 132

[56] References Cited

U.S. PATENT DOCUMENTS

| | | | |
|---|---|---|---|
| 4,611,267 | 9/1986 | McMurray | 363/58 |
| 4,811,187 | 3/1989 | Nakajima et al. | 363/25 |
| 4,857,822 | 8/1989 | Tabisz et al. | 323/282 |
| 5,612,862 | 3/1997 | Marusik et al. | 363/93 |
| 5,805,434 | 9/1998 | Vinciarelli et al. | 363/16 |

*Primary Examiner*—Adolf Deneke Berhane
*Attorney, Agent, or Firm*—Helfgott & Karas, P.C.

[57] ABSTRACT

A DC—DC converter unit includes a power conversion transformer, a switching device for switching a DC voltage supplied to a primary winding of the power conversion transformer, a rectifying circuit for synchronously rectifying a AC voltage generated on a secondary winding of the power conversion transformer so that a DC voltage is obtained, and a reset circuit for resetting excitation energy which has been stored in the power conversion transformer by an on-operation of the switching device, so that the voltage which is switched has a square waveform.

7 Claims, 10 Drawing Sheets

DC-DC CONVERTER UNIT

BACKGROUND OF THE INVENTION

1. Field of the Invention

The present invention generally relates to a DC—DC converter unit, and particularly to a DC—DC converter unit in which a synchronous rectifying circuit is advanced so that the conversion efficiency is improved and the miniaturization can be achieved.

2. Description of the Related Art

A conventional DC—DC converter unit is formed as shown in FIG. 1. This DC—DC converter unit is a forward-type converter. Referring to FIG. 1, a primary sided of a power conversion transformer T is applied with a DC voltage Vin and connected with a smoothing capacitor Cin. A field effect transistor (FET) which is operated as a switching device is serially connected to a primary winding N1 of the power conversion transformer T. The FET is symbolized by Q1. A control circuit 1 detects an output voltage and supplies a PWM signal to the switching device Q1 so that the output voltage is maintained at a constant value. The PWM pulses from the control circuit 1 is supplied to the gate of the switching device (FET) Q1.

A secondary winding N2 of the power conversion transfer T is connected with diodes D1 and D2 which are used for the full-wave rectification. The rectified DC voltage is output from a point at which cathodes of the diodes D1 and D2 are connected to each other. The DC voltage is smoothed by a choke coil L1 and a capacitor Co and power is supplied to a load 2. The diode D1 is in a conductive state when the switching device Q1 is in an on-state. The diode D1 is named a rectifying diode. The diode D2 is in a conductive state when the switching device Q1 is in an off-state. The diode D2 is named a commutating diode. The output voltage (the DC voltage) is monitored. The detected output voltage Vo is then fed back to the control circuit 1.

The circuit having the above structure is operated as follows.

Due to the on-voltage signal from the control circuit 1, the switching device Q1 is turned on. At this time, an input voltage Vin is applied to the primary winding of the power conversion transformer T. A voltage corresponding to a winding ratio is generated from the secondary winding. The power corresponding to this voltage is supplied to the load 2 through a smoothing filter (the diode D1, the choke coil L1 and the capacitor Co).

On the other hand, when the switching device Q1 is turned off, the smoothing coil (the choke coil) L1 is operated as a power source, so that the power is supplied to the load 2 through the smoothing filter (the choke coil L1, the capacitor Co and the diode D2). The operating waveforms in respective points are shown in FIG. 2. Referring to FIG. 2, a PWM control pulse (a), a drain-source voltage Vds of the switching device Q1 (b), a current Id flowing through the drain of the switching device Q1 (c), a primary winding voltage Vt1 of the power conversion transformer T (d), a secondary winding voltage Vt2 of the power conversion transformer T (e), a voltage Vd1 supplied between both ends of the rectifying diode D1 (f), a current Id1 flowing through the rectifying diode D1 (g), a voltage Vd2 supplied between both ends of the commutating diode D2 (h) and a current Id2 flowing through the commutating diode D2 are provided. The drain-source voltage Vds of the switching device Q1 has waveform parts which are rounded as shown by (b) in FIG. 2. The rounded waveform parts are caused by a reset voltage (the LC resonance) based on transformer excitation energy.

This unit is operated at a constant switching frequency (the period $t=t_{on}+t_{off}$). The output voltage Vo is detected and fed back to the control circuit 1 which carries out the PWM control so that the output voltage is maintained at a constant value. The control circuit 1 controls the on-width of the switching device Q1 operated at the constant switching frequency so that the output voltage is controlled. The output voltage Vo is represented by the following equation.

$$Vo=(N2/N1)\cdot D\cdot Vin \quad (1)$$

In the above equation, Vin is the input voltage, N1 is the number of turn of the primary winding of the power conversion transformer and N2 is the number of turn of the secondary winding of the power conversion transformer. D is a time ratio represented by $t_{on}/t$. The period t is defined by $t=1/f$ (f is the frequency) and has a constant value.

The above type of unit is very simple and generally used. In the recent years, miniaturization and high-efficiency of the power supply are desired. Thus, the loss factor in the rectifying diodes D1 and D2, which appears as about 30% through 40%, has to be improved. Providing that the forward voltage Vf (about 1 volt) is generated by each of the rectifying diodes D1 and D2 and the current I flows through each of the diodes D1 and D2, the power loss of Vf·I is generated. In the recent years, Schottky barrier diodes having a low forward voltage are used as the rectifying diodes D1 and D2.

To further improve the power loss, the use of a MOS-FET having a low ON-state resistance instead of each of the rectifying diodes D1 and D2 has been examined. Providing that a power supply has a output characteristic of 5 volts (V)/10 amperes (A), the power loss is as follows.

In a case where the Schottky barrier diodes are used, since the forward voltage of the diode is about 0.4 volts (V), the power loss Ps is estimated as $$Ps=Vf \times Io=0.4(V)\times 10(A)=4\ [W].$$

In a case where the MOS-FET having the low ON-state resistance is used, the ON-state resistance Rds of the MOS-FET is about 10 mΩ, the power loss Ps is estimated as $$Ps=Rds\times Io^2 =10m\Omega\times 10^2\,A=1\ [W].$$

In the later case, the power loss generated in the output rectifying diode portion is one fourth as large as that in the former case.

FIG. 3 shows a conventional unit (the power conversion portion) in which FETs are used as the rectifying circuit. In FIG. 3, those parts which are the same as those shown in FIG. 1 are given the same reference numbers. A rectifying FET Q2 is substituted for the rectifying diode D1 and a commutating FET Q3 is substituted for the commutating diode D2. Each of the FETs has a parasitic diode as shown by a dashed line in FIG. 3.

Operating waveforms of the unit as described above are shown in FIG. 4. In this unit, the gate of each of the FETs Q2 and Q3 are driven by using the voltage generated by the secondary winding of the power conversion transformer T so that each of the FETs is turned on and off. FIG. 4 shows the voltage generated by the secondary winding of the power conversion transformer T and the operating waveforms of the FETs Q2 and Q3. That is, in FIG. 4, the voltage Vt2 generated by the secondary winding of the power conversion transformer T (a), the gate voltage Vgs1 of the FET Q2 (b), the drain current Id1 flowing through the FET Q2 (c), the gate voltage Vgs2 of the FET Q3 (d) and the drain current Id2 flowing through the FET Q3 are provided.

When the switching device Q1 is in the on-state, the voltage (A) is generated by the secondary winding of the power conversion transformer T as shown in FIG. 4(a). The voltage (A) is supplied between the gate and source of the FET Q2 through a loop including a leading end of the secondary winding of the power conversion transformer T, the gate of the FET Q2, the source of the FET Q2, the parasitic diode of the FET Q2 and a trailing end of the secondary winding of the power conversion transformer T. Due to the voltage (A), the FET Q2 is turned on and the drain current Id1 flows as shown in FIG. 4(c).

On the other hand, when the switching device Q1 is turned off, the polarity of the voltage generated by the secondary winding of the power conversion transformer T is inverted as shown by (B) in FIG. 4(a). At this time, the voltage (B) is supplied between the gate and source of the FET Q3 through a loop including the trailing end of the secondary winding of the power conversion transformer T, the gate of the FET Q3, the source of the FET Q3, the parasitic diode of the FET Q3 and the leading end of the secondary winding of the power conversion transformer T. Due to the voltage (B), the FET Q3 is turned on and the drain current Id2 flows as shown in FIG. 4 (e).

In the conventional unit using the FETs, there is a term (C) in which no voltage is generated by the secondary winding of the power conversion transformer T in each period as shown in FIG. 4 (a). In the term (C), since no voltage is supplied to the FET Q3, the gate of the FET Q3 is in a floating state so that the FET Q3 can not be turned on. Thus, a load current completely flows through the parasitic diode.

The forward voltage of the parasitic diode is not less than 1 volt (V), so that a large amount of power loss is generated and the high efficiency is prevented. Further, since the parasitic diode has a large reverse recovery time, a state where a short-circuit current flows through the parasitic diode is maintained in a moment that the switching device Q1 is turned on in the next period. In this moment, the short-circuit current flows the switching device Q1, so that the loss generated by the switching device Q2 is increased.

In addition, to eliminate the above disadvantage, the Schottky barrier diode having the low forward voltage has to be connected to the FET in parallel. As a result, the production cost of the unit may be increased and the unit may be enlarged.

SUMMARY OF THE INVENTION

Accordingly, a general object of the present invention is to provide a novel and useful DC—DC converter unit in which the disadvantages of the aforementioned prior art are eliminated.

A specific object of the present invention is to provide a DC—DC converter unit which is miniaturized and operates with a high efficiency.

The above objects of the present invention is achieved by a DC—DC converter unit comprising: a power conversion transformer; a switching device for switching a DC voltage supplied to a primary winding of said power conversion transformer; a rectifying circuit for synchronously rectifying a AC voltage generated on a secondary winding of said power conversion transformer so that a DC voltage is obtained; and a reset circuit for resetting excitation energy which has been stored in said power conversion transformer by an on-operation of said switching device, so that the voltage which is switched has a square waveform.

According to the present invention, the excitation energy which has been stored in the power conversion transformer by the on-operation of the switching is compulsorily expended or effectively used by the reset circuit when the switching device is turned off. The reset voltage can have the square waveform, so that an FET in the rectifying circuit can be completely turned on and off. The miniaturized DC—DC converter unit which can be operated at high efficiency can be provided.

BRIEF DESCRIPTION OF THE DRAWINGS

Other objects, features and advantages of the present invention will be apparent from the following description when read in conjunction with the accompanying drawings, in which.

DESCRIPTION OF THE PREFERRED EMBODIMENTS

Figure 1:
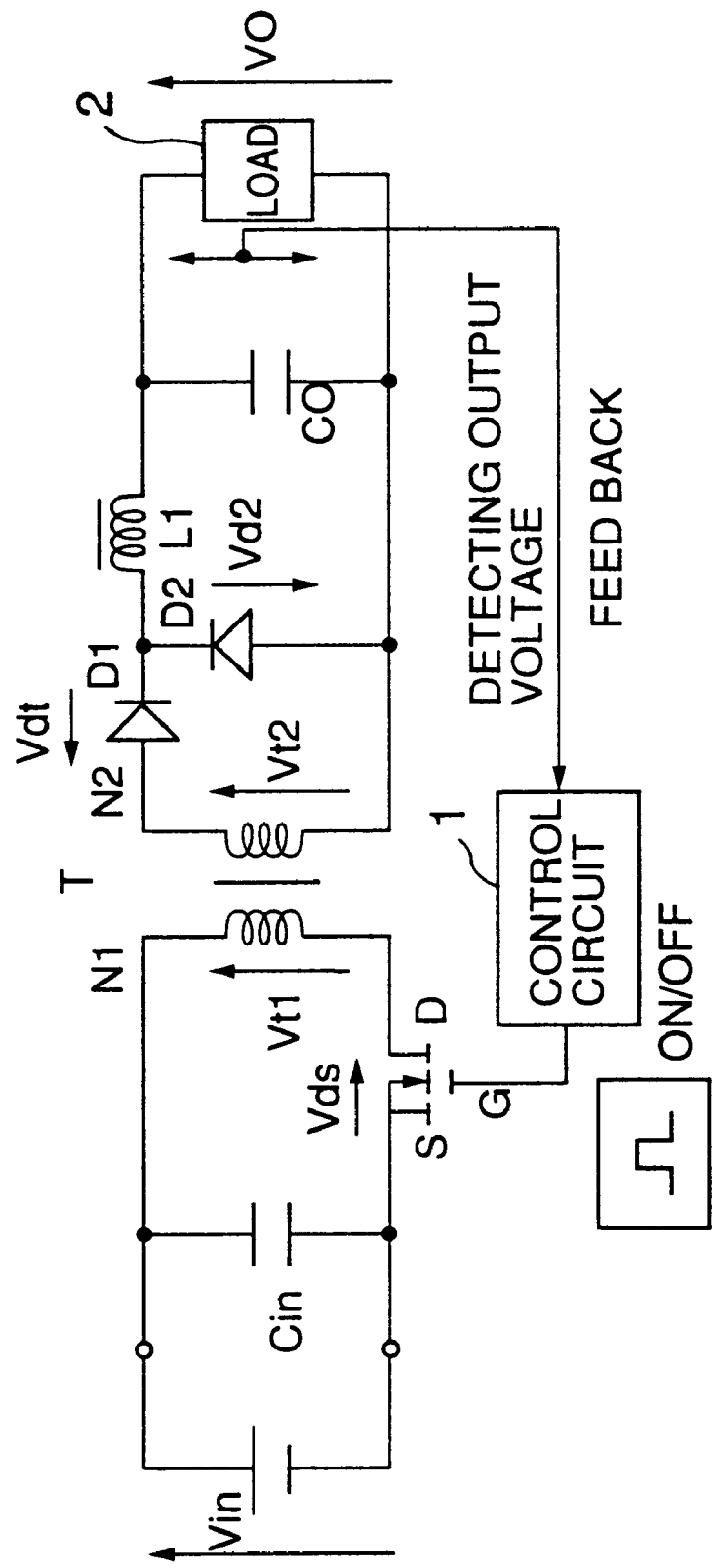
FIG. 1 is a circuit diagram illustrating an example of a conventional DC—DC converter unit.
Figure 2:
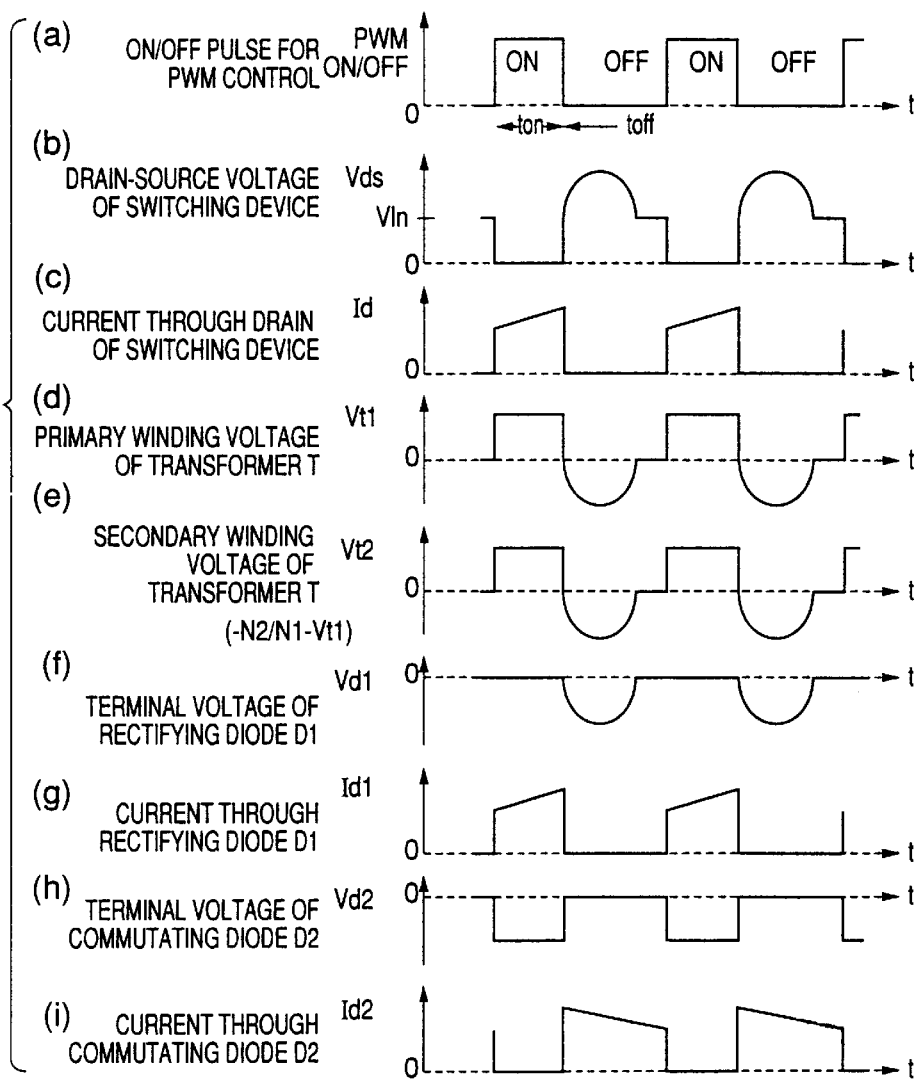
FIG. 2(a)–(c) are waveform diagram illustrating operating waveforms in the unit shown in FIG. 1.
Figure 5:
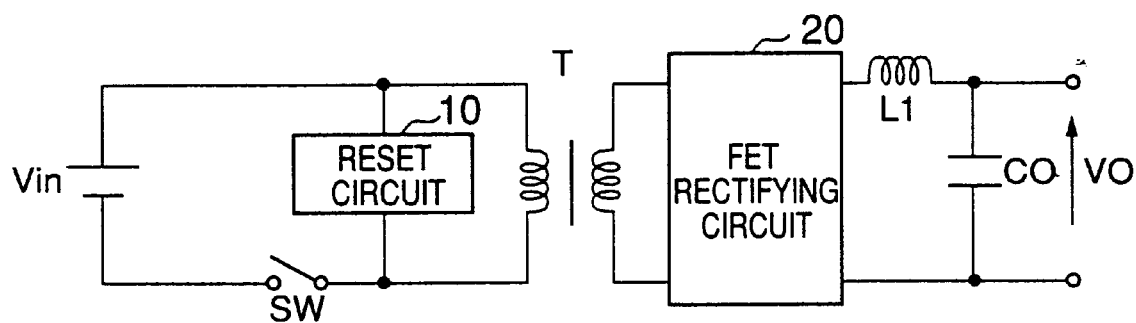
FIG. 5 is a block diagram illustrating a DC—DC converter unit according to the present invention.

First, a description will be given, with reference to FIG. 5, of the principle of the DC—DC converter unit according to the present invention. In FIG. 5, those parts which are the same as those shown in FIG. 1 are given the same reference numbers. Referring to FIG. 5, on the primary side of the power conversion transformer T, the primary winding of the power conversion transformer T is supplied with a DC voltage Vin and connected with a reset circuit 10 in parallel. A switching device SW used for switching of the DC voltage is provided. The reset circuit 10 resets the excitation energy which is stored in the power conversion transformer T when the switching device SW is turned on, so that the switched voltage waveform is shaped as a square wave. The reset circuit 10 may be connected to the secondary winding of the power conversion transformer T in parallel.

On the secondary side of the power conversion transformer T, a FET rectifying circuit 20, the choke coil L1 and the smoothing capacitor Co are provided. The FET rectifying circuit 20 synchronously rectifies an AC voltage generated on the secondary side. The choke coil L1 receives an output of the FET rectifying circuit 20. A voltage applied to the smoothing capacitor Co is an output voltage Vo of the DC—DC converter unit.

In the DC—DC converter unit having the above structure, the excitation energy is stored in the power conversion transformer T when the switching device SW is turned on. The stored excitation energy is not spontaneously discharged and compulsorily expended or effectively used by the reset circuit 10 when the switching device SW is turned off. As a result, the reset voltage can be shaped as the square waveform Thus, the output commutating FET in the FET rectifying circuit 20 can be completely turned on, so that the DC—DC converter unit can be miniaturized and operated with a high efficiency.

A description will now be given of a first embodiment of the present invention.

Figure 6:
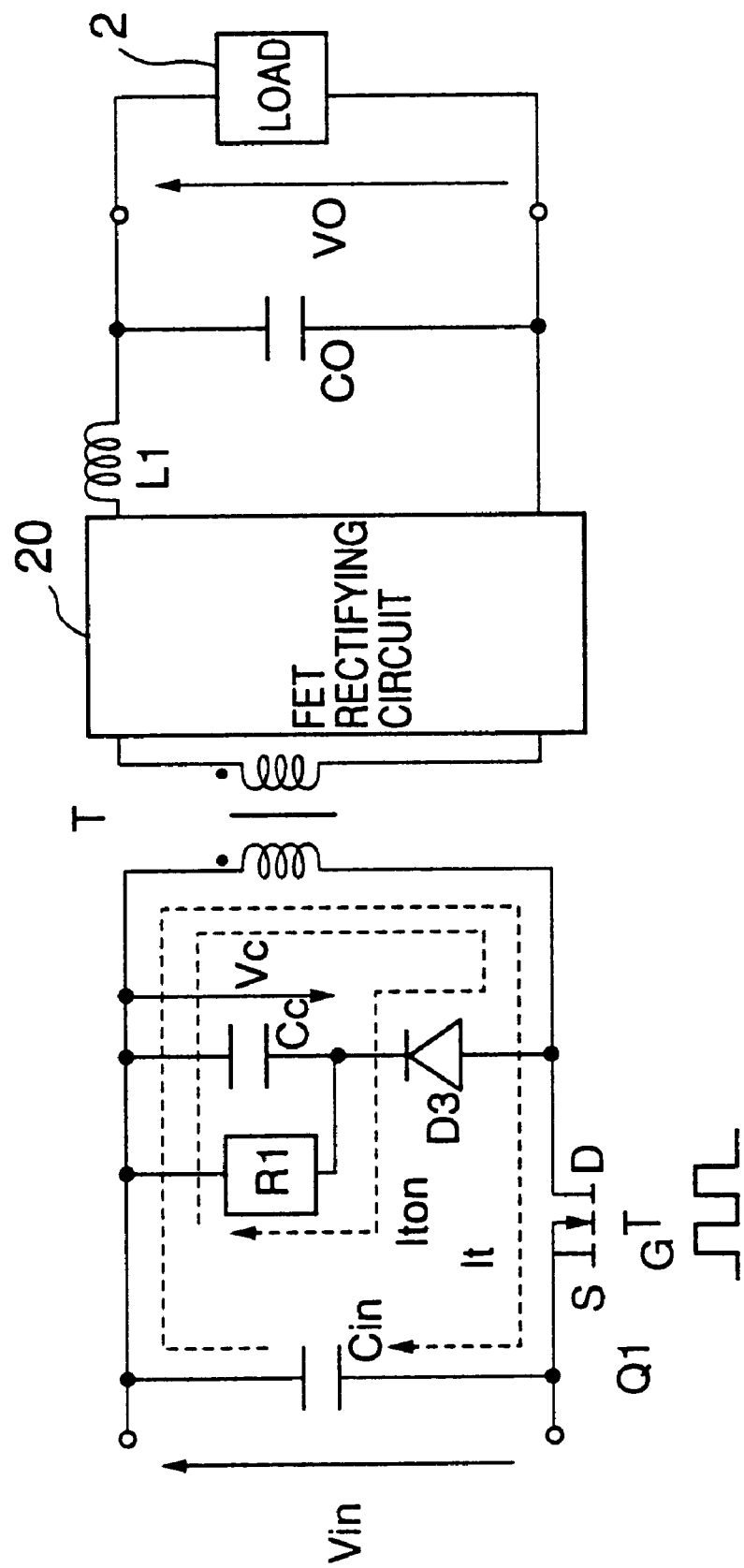
FIG. 6 is a circuit diagram illustrating a DC—DC converter unit according to a first embodiment of the present invention.

A DC—DC converter unit according to a first embodiment of the present invention is formed as shown in FIG. 6. In FIG. 6, those parts which are the same as those shown in FIG. 5 are given the same reference numbers. Referring to FIG. 6, an FET is provided as the switching device Q1 on the primary side of the power conversion transformer T. The drain (D) and the source (S) of the switching device Q1 are serially coupled to the primary winding of the power conversion transformer T. The gate of the switching device Q1 is supplied with the PWM pulse.

On the primary side of the power conversion transformer T, a serial circuit formed of a diode D3 and a capacitor Cc is connected to the primary winding in parallel. A resistor R1 is connected to the capacitor Cc in parallel. The diode D3, the capacitor Cc and the resistor Rs form the reset circuit 10 shown in FIG. 5. The capacitor Cc has a large capacity so as to be not completely discharged in each period. The input voltage Vin is supplied to the primary winding of the power conversion transformer T and the output voltage Vo output from the secondary side of the power conversion transformer T. The load 2 is connected to the secondary winding of the power conversion transformer T in parallel.

The DC—DC converter unit having the structure as described above is operated as follows.

When the switching device Q1 is turned on (a $t_{on}$ term), the input voltage Vin is supplied between both end of the primary winding of the power conversion transformer T. As a result, an excitation current $It^{on}$ flows through the primary winding of the power conversion transformer T. In this case, the excitation current $It_{on}$ and the power Pe are respectively represented as follows.

$$It_{on} = Vin \cdot t_{on}/Li \quad (2)$$

In the above equation (2), Li is an inductance of the primary winding of the power conversion transformer T.

$$Pe = (1/2) \cdot Li \cdot (It_{on})^2 \cdot f \quad (3)$$

In the above equation (3), f is a switching frequency of the DC—DC converter unit.

On the other hand, in the conventional case, when the switching device Q1 is turned off, the loop through which the power should be discharged includes a parasitic capacitor, having a large capacitance, existing between the drain and source of the switching device Q1. Thus, although a voltage having a high level is generated, a reset current having a low level flows. As a result, the discharge is rapidly completed and a fee period is provided.

Figure 4:
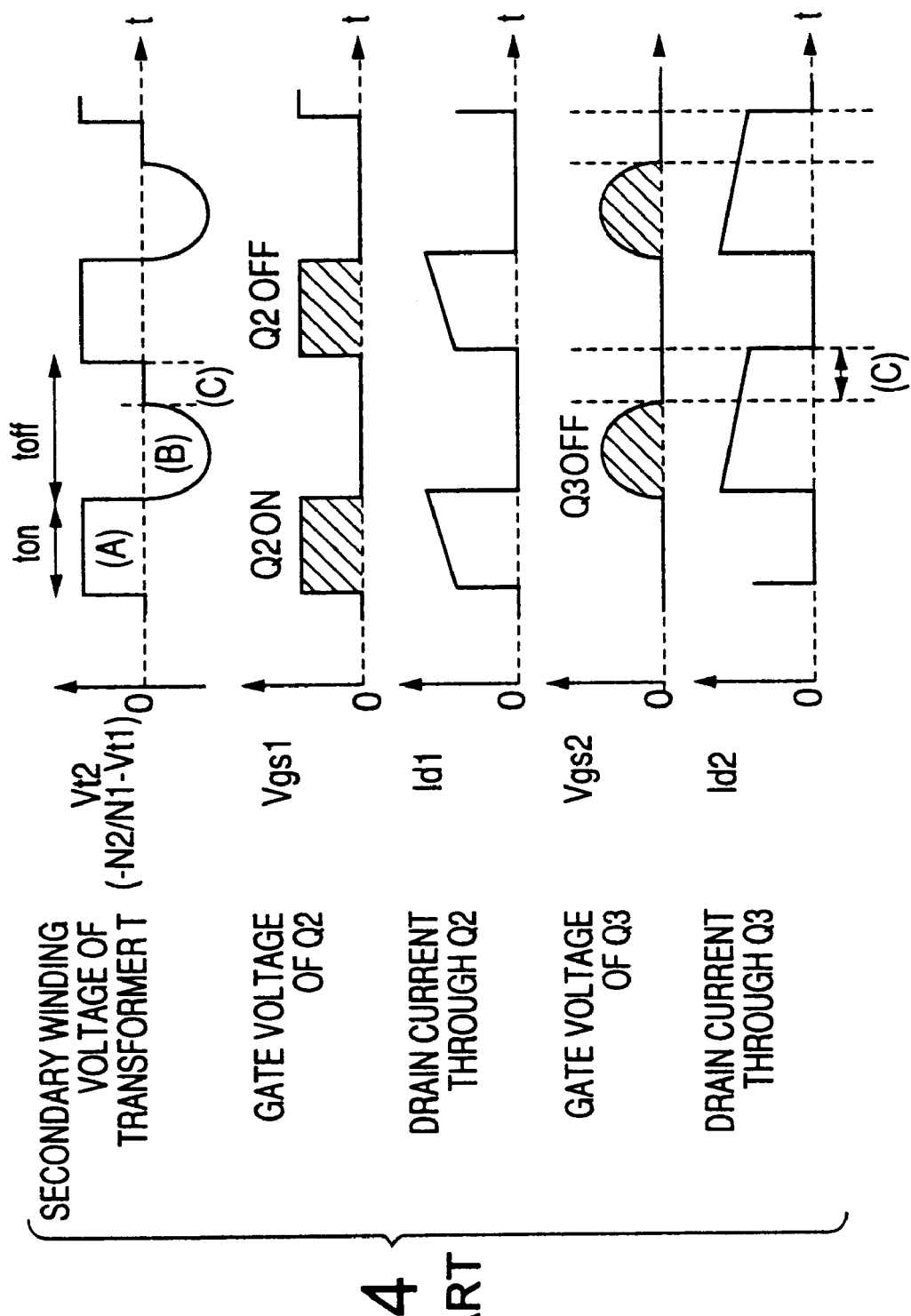
FIG. 4 is a waveform diagram illustrating operating waveforms in the unit shown in FIG. 3.
Figure 7:
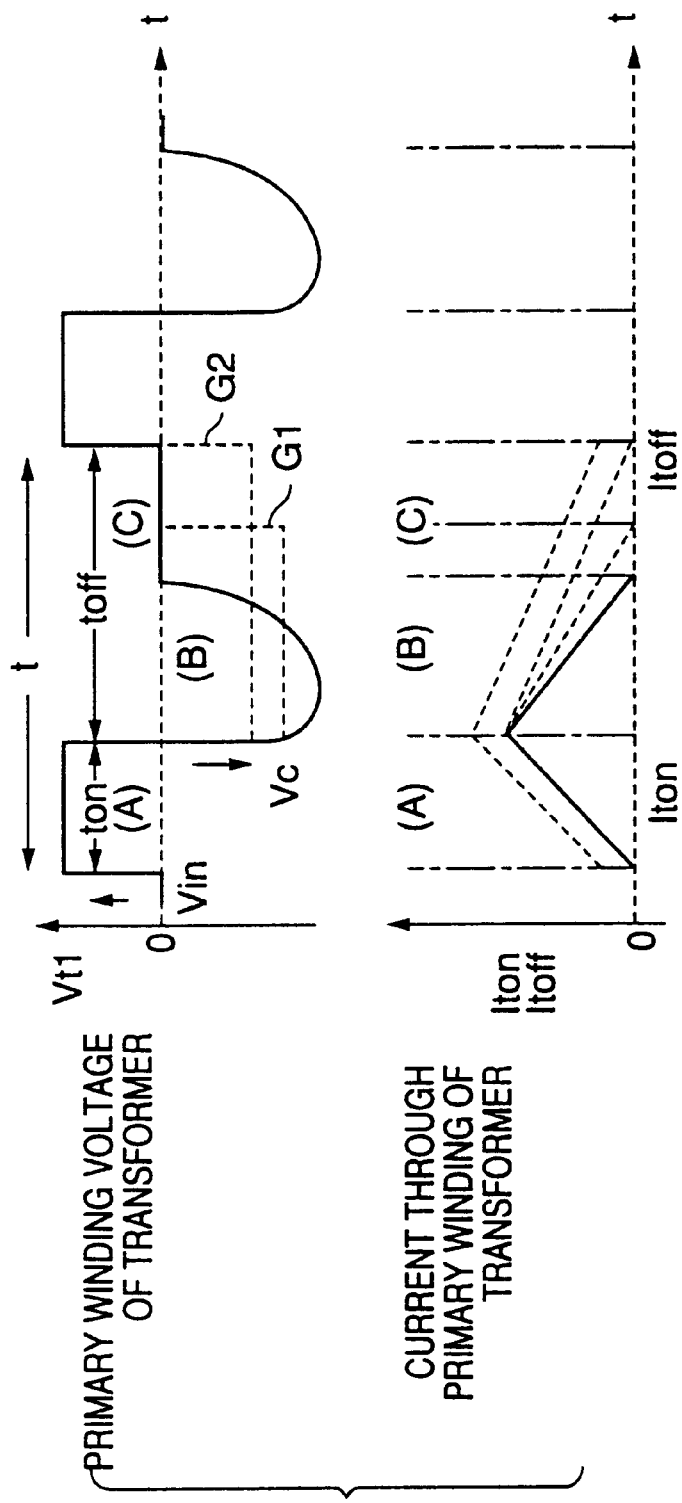
FIG. 7 is a waveform diagram illustrating operating waveforms in the unit according to the first embodiment of the present invention.

FIGS. 7 show operating waveforms at two point in the unit according to the first embodiment of the present invention. FIG. 7(a) shows a waveform of a voltage Vt1 between ends of the primary winding of the power conversion transformer T. FIG. 7(b) shows a waveform of a current flowing through the primary winding of the power conversion transformer T. Referring to FIG. 7(a), there are a term (A) in which the switching device Q1 is in the on-state, a term (B) in which a reverse voltage is generated as in the same manner as in the conventional case (see FIG. 4(a)), and a term (C) in which no voltage is generated. In this term (C), the gate of the commutating FET in the FET rectifying circuit provided on the secondary side of the power conversion transformer T is in the floating state.

Since the reset power is represented by the product of voltage and current, the current is decreased in accordance with the increasing of the voltage. In this embodiment, the reset circuit outputs a reset current $It_{off}$ when the switching device Q1 is turned off. Thus, the reset voltage is shaped as the square waveform. The square wave form indicated by each of dashed lines in the terms (B) and (C) shown in FIG. 7(a) is a waveform of voltage generated between both the ends of the primary winding of the power conversion transformer T in this embodiment. The square waveform is changed from G1 to G2. In a critical state, the voltage having the square waveform G2 is generated. In a case where the square waveform is further shifted to the right, the operation mode is brought into a DC superposing mode.

Referring to FIG. 7(b), when the switching device Q1 is in the on-state, the on-current $It_{on}$ flows. In addition, when the switching device Q1 is in the off-state, the reset current $It_{off}$ flows. The inclination of the reset current $It_{off}$ is changed in accordance with the change of the voltage waveform from G1 to G2. When the value of the resistor R1 is decreased, the waveform of the reset current $It_{off}$ is changed from a waveform corresponding the voltage waveform G1 to a waveform corresponding to the voltage waveform G2. Due to setting the resistor R1 at a proper value, the trailing end of the reverse voltage Vc can meet the leading end of the on-voltage (the critical state).

As a result, the voltage generated by the secondary winding of the power conversion transformer T has also the square waveform, so that the gate of the commutating FET can be completely turned on and off. The reset current $It_{off}$ depends on the value of the resistor R1. There are following three modes depending on the reset current $It_{off}$.

DISCONTINUOUS CURRENT STATE

In the discontinuous mode, the expended power Pe is represented by the following equation.

$$Pe = Vc \cdot It_{off}$$

CRITICAL CURRENT STATE

In the critical operation mode, the expended power Pe is represented by the following equation.

$$Pe = Vc \cdot It_{off}$$

DC BIAS STATE (CONTINUOUS CURRENT STATE)

In the DC superposing mode, the expended power Pe is represented by the following equation.

$$Pe = Vc \cdot It_{off} + a$$

As being clear from the waveforms shown in FIGS. 7A and 7B, if the resistor R1 is set at a value so that the operation is executed in the modes (B) and (C), the reset voltage Vc can be formed as the square waveform. Since the reset voltage Vc is varied based on the variation of the input voltage, it is difficult to be operated in the critical current state. Thus, it is preferable that the operation is executed in the state. In this embodiment, the output voltage Vo is controlled by using the following time ratio D, but the reset voltage Vc is not controlled. Thus, the reset voltage Vc is varied based on the time ratio D. With regard to this variation, the DC is superposed so that the operation is executed in the critical operation at worst.

In the critical current state and the DC bias state, the reset voltage Vc is represented by the following equation.

$$Vc = (D/(1-D)) \cdot Vin \qquad (4)$$

According to the embodiment as described above, the reset circuit is provided between both the ends of the primary winding of the power conversion transformer T, so that the energy which has been stored in the power conversion transformer T when the switching device Q1 is turned off is expended or effectively used. The reset voltage can have the square waveform. Thus, the FET forming the synchronous rectifying circuit can be accurately turned on and off, so that the miniaturized DC—DC converter unit which can be operated at high efficiency can be provided.

Figure 3:
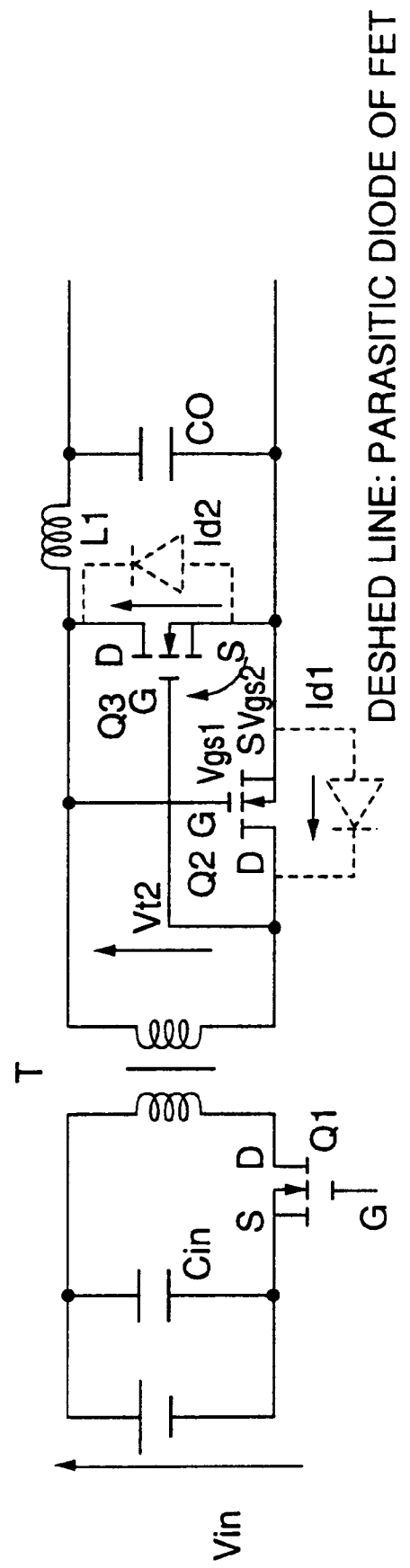
FIG. 3 is a circuit diagram illustrating another example of the conventional DC—DC converter unit.
Figure 8:
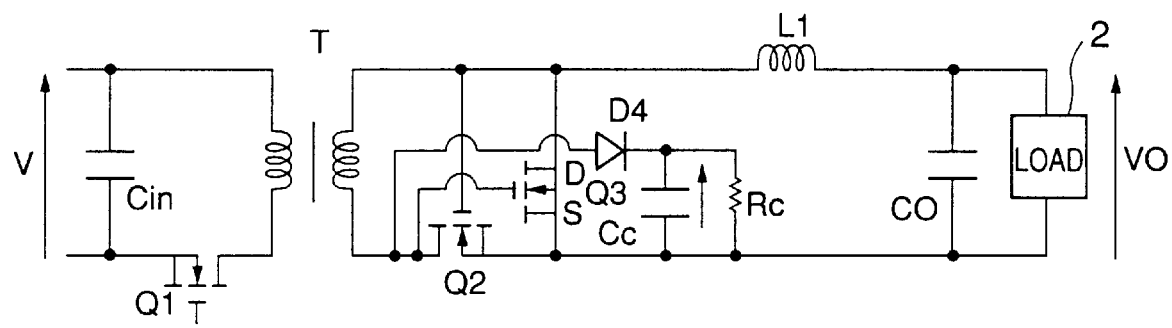
FIG. 8 is a circuit diagram illustrating the DC—DC converter unit according to a second embodiment of the present invention.

A description will now be given of a second embodiment of the present invention. The DC—DC converter unit according to the second embodiment of the present invention is formed as shown in FIG. 8. In FIG. 8, those parts which are the same as those shown in FIGS. 3 and 6 are given the same reference numbers. Referring to FIG. 8, on the secondary side of the power conversion transformer T, a rectifying FET Q2 which is serially connected to the secondary winding of the power conversion transformer T and a commutating FET Q3 which are connected to the secondary winding of the power conversion transformer T in parallel are provided.

The DC—DC converter unit is provided with a diode D4, a capacitor Cc serially connected to the diode D4 and a resistor Rc connected to the capacitor Cc in parallel. The diode D4, the capacitor Cc and the resistor Rc form the reset circuit 10. The circuit formed as described above is operated as follows.

The excitation energy which has been stored in the power conversion transformer T by the on-operation of the switching device Q1 is discharged by the reset circuit 10 having the diode D4, the capacitor Cc and the resistor Rc when the switching device Q1 is turned off. At this time, the reset current flows a loop from a trailing end of the secondary winding of the power conversion transformer T, through the diode D4, the capacitor Cc, the resistor Rc, the source of the FET Q3 and the drain of the FET Q3, to the leading end of the secondary winding.

Due to the operation of the power conversion transformer T in the DC superposing mode or the critical operating mode as described above, the reset voltage can have the square waveform. As a result, the gate of the commutating FET Q3 is prevented from being in the floating state and the FET Q2 can be completely turned on and off.

According to the second embodiment as described above, due to the reset circuit provided between both the ends of the secondary winding of the power conversion transformer T, the energy which has been stored in the power conversion transformer T by the off-operation of the switching device Q1 is expended and effectively used. The reset voltage can have the square waveform. Thus, the FET (Q3) forming the synchronous rectifying circuit can be accurately turned on and off. The miniaturized DC—DC converter unit which can be operated at high efficiency can be provided.

Figure 9:
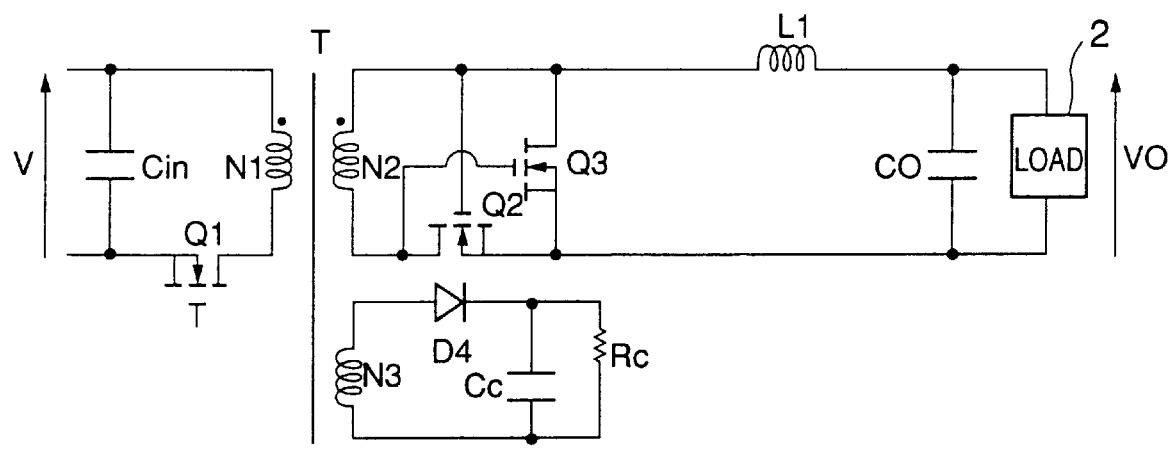
FIG. 9 is a circuit diagram illustrating the DC—DC converter unit according to a third embodiment of the present invention.

The DC—DC converter unit according to a third embodiment of the present invention is formed as shown in FIG. 9. In FIG. 9, those parts which are the same as those shown in FIG. 8 are given the same reference numbers. In this embodiment, the primary winding N1 and secondary winding N2 are provided and a tertiary winding N3 is additional provided. Between both ends of the tertiary winding N3, the reset circuit 10 is provided. The reset circuit 10 is formed of the diode D4, the capacitor Cc serially connected to the diode D4 and the resistor Rc connected to the capacitor Cc in parallel.

According to the third embodiment, due to the reset circuit provided between the ends of the tertiary winding of the power conversion transformer T, the energy which has been stored in the power conversion transformer T by the off-operation of the switching device Q1 is expended or effectively used. The reset voltage can have the square waveform. Thus, the FET (Q3) forming the synchronous rectifying circuit can be accurately turned on and off. The miniaturized DC—DC converter unit which are operated at high efficiency can be provided.

Figure 10:
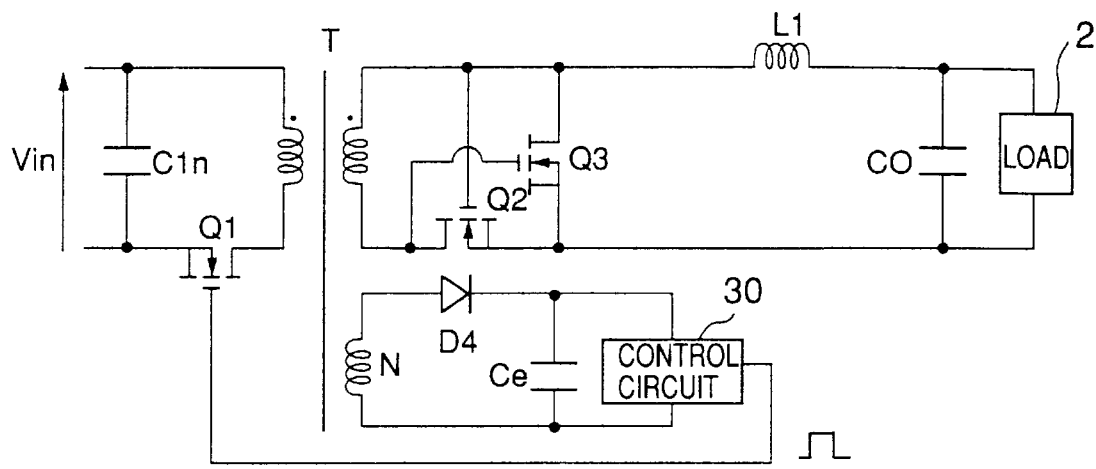
FIG. 10 is a circuit diagram illustrating the DC—DC converter unit according to a fourth embodiment of the present invention.

The DC—DC converter unit according to a fourth embodiment of the present invention is formed as shown in FIG. 10. In FIG. 10, those parts which are the same as those shown in FIG. 9 are given the same reference numbers. In this embodiment, the power expended by the resistor Rc in the third embodiment shown in FIG. 9 is used as a power supply for the PWM control circuit for driving the switching device Q1.

Referring to FIG. 10, the PWM control circuit 30 is provided. The energy which has been stored in the power conversion transformer T by the off-operation of the switching device Q1 is discharged. At this time, the energy is stored in the capacitor Cc. The voltage applied to the capacitor Cc is supplied to the control circuit 30 as a power supply.

The PWM pulse is output from the control circuit 30 and supplied to the gate of the switching device Q1. The auxiliary power is needed to drive a switching control IC used in the power supply and the switching device Q1. The auxiliary power is always a loss.

According to the fourth embodiment, the energy which has been stored in the power conversion transformer T is used as auxiliary power of a power control circuit for generating the PWM pulse which drives the switching device Q1. Thus, the power conversion efficiency can be improved.

Figure 11:
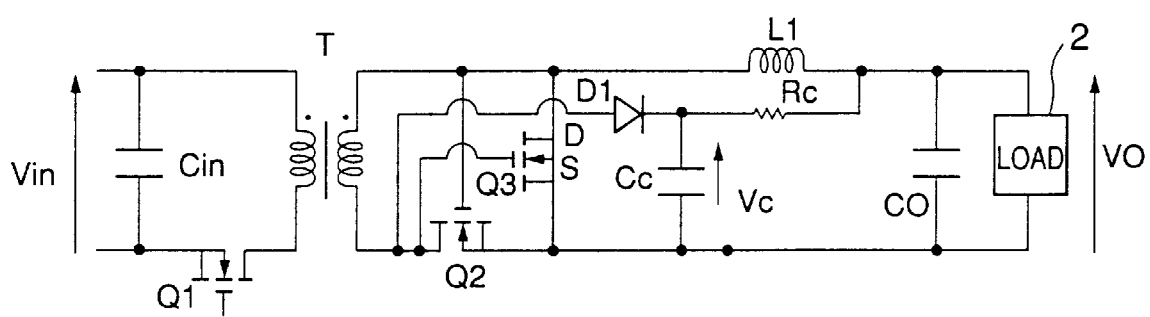
FIG. 11 is a circuit diagram illustrating the DC—DC converter unit according to a fifth embodiment of the present invention.

The DC—DC converter unit according to a fifth embodiment of the present invention is formed as shown in FIG. 11. In FIG. 11, those parts which are the same as those shown in FIG. 8 are given the same reference numbers. Although the reset power is expended by the resistor Rc in the second embodiment shown in FIG. 8, the reset power is supplied to the load 2, but not expended by the resistor Rc, in this embodiment.

According to the fifth embodiment of the present invention, the power to be expended by the reset circuit is supplied to the load, so that the power conversion efficiency can be improved.

Figure 12:
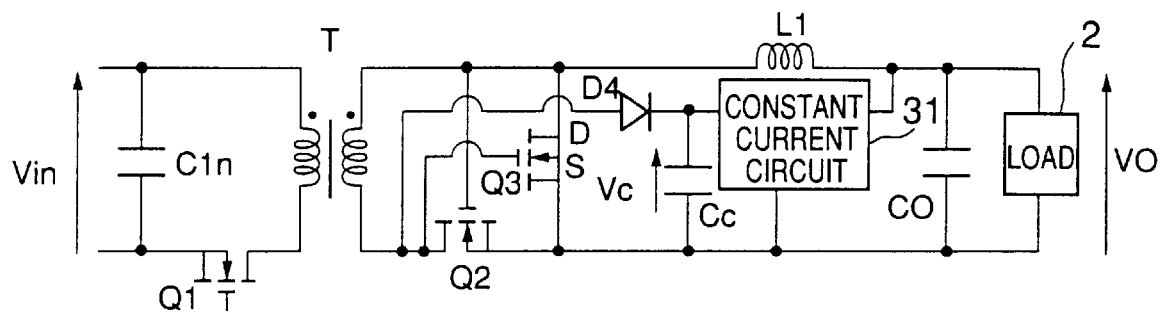
FIG. 12 is a circuit diagram illustrating the DC—DC converter unit according to a sixth embodiment of the present invention.

The DC—DC converter unit according to a sixth embodiment of the present invention is formed as shown in FIG. 12. In FIG. 12, those parts which are the same as those shown in FIG. 11 are given the same reference numbers. In this embodiment, a constant current circuit is substituted for the resistor Rc shown in FIG. 11. The reset power is supplied to the load as a constant current. Referring to FIG. 12, a constant current circuit 31 is provided.

According to the sixth embodiment of the present invention, the power to be expended by the reset circuit is supplied to the load as a constant current. Thus, the power conversion efficiency can be improved.

Figure 13:
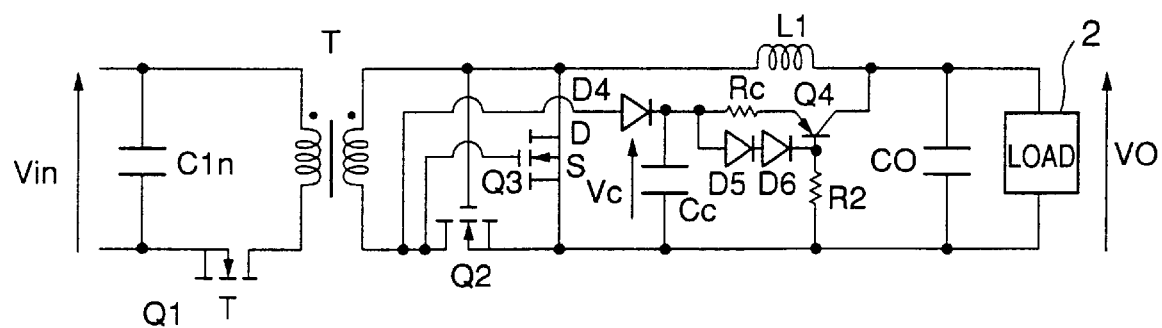
FIG. 13 is a circuit diagram illustrating the DC—DC converter unit according to a seventh embodiment of the present invention.

The DC—DC converter unit according to a seventh embodiment of the present invention is formed as shown in FIG. 13. In this embodiment, a circuit corresponding to the constant current circuit 31 shown in FIG. 12 is formed using a transistor. The circuit has a transistor Q4. The base of the transistor Q4 is connected a common line so that the common base type connection is formed.

An end of the resistor Rc is connected to the emitter of the transistor Q4 and the power is supplied from the collector to the load 2. Between another end of the resistor Rc and the base of the transistor Q4, a serial circuit having diodes D5 and D6 is connected.

In this constant current circuit, the diodes D5 and D6 supplies a constant voltage between the base and emitter of the transistor Q4 so that common base type transistor circuit is formed. Thus, the transistor circuit has a high output impedance so as to be used as the constant current circuit.

According to the seventh embodiment of the present invention, the power to be expended by the reset circuit is supplied to the load as a constant current. Thus, the power conversion efficiency can be improved.

According to the present invention, the unit can have a high efficiency in comparison with the conventional case, so that the expended power can be decreased (the driving cost is decreased).

The radiation fin to be mounted on the conventional rectifying diode can be miniaturized or removed. The cost reduction and the miniaturization are possible.

In the above embodiments, the field effect transistor (FET) is used as the switching device. However, the present invention is limited to this, another type of switching device (e.g., a bipolar transistor) can be used.

The present invention is not limited to the aforementioned embodiments, and other variations and modifications may be made without departing from the scope of the claimed invention.

What is claimed is:

1. A DC—DC converter unit comprising:
    a power conversion transformer;
    a switching device switching a DC voltage supplied to a primary winding of said power conversion transformer;
    a synchronous rectifying circuit rectifying a AC voltage generated on a secondary winding of said power conversion transformer in synchronization with the switched DC voltage supplied to said primary winding of said power conversion transformer; and
    a reset circuit for resetting excitation energy stored in said power conversion transformer by an on-operation of said switching device, a voltage generated in said primary winding of said power conversion transformer having a square waveform when said switching device is turned off.

2. The unit as claimed in claim 1, wherein said reset circuit comprises:
    a diode;
    a capacitor serially connected to said diode, a circuit having said diode and said capacitor being provided between ends of said primary winding of said power conversion transformer; and
    a resistor connected to said capacitor in parallel.

3. The unit as claimed in claim 1, wherein said reset circuit comprises:
    a diode;
    a capacitor serially connected to said diode, a circuit having said diode and said capacitor being provided between ends of said secondary winding of said power conversion transformer; and
    a resistor connected to said capacitor in parallel.

4. The unit as claimed in claim 3, wherein said circuit having said diode and said capacitor supplies power to a load via said resistor.

5. The unit as claimed in claim 4, wherein a constant current circuit is substituted for said resistor.

6. The unit as claimed in claim 1, wherein said reset circuit comprises:
    a tertiary winding provided in said power conversion transformer;
    a diode;
    a capacitor serially connected to said diode, a circuit having said diode and said capacitor being provided between ends of said tertiary winding; and
    a resistor connected to said capacitor in parallel.

7. The unit as claimed in claim 6, wherein an auxiliary power which activates a power control circuit is used substituting for said resistor.

* * * * *

UNITED STATES PATENT AND TRADEMARK OFFICE
CERTIFICATE OF CORRECTION

PATENT NO.    : 6,040,987  
DATED         : March 21, 2000  
INVENTOR(S)   : Kenji Kudo et al.

It is certified that error appears in the above-identified patent and that said Letters Patent is hereby corrected as shown below:

<u>Title page</u>,
Amend Item [73] to add the name of the second assignee, so that Item [73] reads as follows:
-- [73]  Assignee:  Fujitsu Limited, Kanagawa, Japan
                   Fujitsu Denso Limited, Kanagawa, Japan --

Signed and Sealed this

Second Day of July, 2002

*Attest:*

JAMES E. ROGAN
*Attesting Officer*      *Director of the United States Patent and Trademark Office*